United States Patent [19]

Synfelt

[11] Patent Number: 5,509,780
[45] Date of Patent: Apr. 23, 1996

[54] APPARATUS AND METHOD FOR PROVIDING UNIFORM RADIAL CLEARANCE OF SEALS BETWEEN ROTATING AND STATIONARY COMPONENTS

[75] Inventor: Edward G. Synfelt, Schenectady, N.Y.

[73] Assignee: General Electric Co., Schenectady, N.Y.

[21] Appl. No.: 400,940

[22] Filed: Mar. 8, 1995

[51] Int. Cl.⁶ ..................................... F01D 11/02
[52] U.S. Cl. .................... 415/174.1; 415/174.5; 277/1; 277/53; 277/54; 277/149; 29/889.1; 29/889.22
[58] Field of Search ............... 415/174.1, 174.2, 415/174.5; 277/53, 54, 149, 1; 29/889.1, 889.22; 411/383, 384, 397

[56] References Cited

U.S. PATENT DOCUMENTS

| | | |
|---|---|---|
| 817,330 | 4/1906 | Moran . |
| 1,292,101 | 1/1919 | Shaw . |
| 1,416,472 | 5/1922 | Kerns . |
| 1,792,288 | 2/1931 | Dempster . |
| 1,855,890 | 4/1932 | Phillips . |
| 2,279,863 | 4/1942 | Downer . |
| 2,600,991 | 6/1952 | Hargrove . |
| 3,460,843 | 8/1969 | Jaeger . |
| 3,594,010 | 7/1971 | Warth . |
| 4,017,088 | 4/1977 | Lerjen . |
| 4,436,311 | 3/1984 | Brandon . |
| 4,684,304 | 8/1987 | Franks .................... 411/383 |
| 5,002,288 | 3/1991 | Morrison et al. . |
| 5,181,308 | 1/1993 | Gray et al. . |
| 5,208,043 | 5/1993 | Gatarz et al. . |
| 5,358,367 | 10/1994 | Yang ........................ 411/397 |
| 5,362,072 | 11/1994 | Dalton ................... 415/174.1 |
| 5,374,068 | 12/1994 | Jewett . |

FOREIGN PATENT DOCUMENTS

| | | |
|---|---|---|
| 299068 | 3/1929 | United Kingdom . |
| 724316 | 2/1955 | United Kingdom . |
| 926824 | 5/1963 | United Kingdom . |
| 934565 | 8/1963 | United Kingdom . |

Primary Examiner—Edward K. Look
Assistant Examiner—Christopher Verdier
Attorney, Agent, or Firm—Nixon & Vanderhye

[57] ABSTRACT

Arcuate seal segments have radially directed seal faces forming part of a labyrinth seal in a turbine. The segments are adjustably spaced from the locating flanges of the groove formed on a stationary part of the turbine housing to compensate for any distortion of the groove through use. Where the locating flanges of the segments normally engage the locating flanges of the groove, variable clearances are provided between those flanges by using locating elements in circumferentially spaced slots along the seal segments such that the seal faces of the segments are maintained concentric, notwithstanding distortion of the locating fits. The locating elements each include a pin secured to the sealing segment, a shim of a selected thickness selected from a set of shims of different thicknesses and a nut for threading onto the pin to project the shim below the locating flanges of the sealing segment for engagement with the locating flanges of the groove.

10 Claims, 5 Drawing Sheets

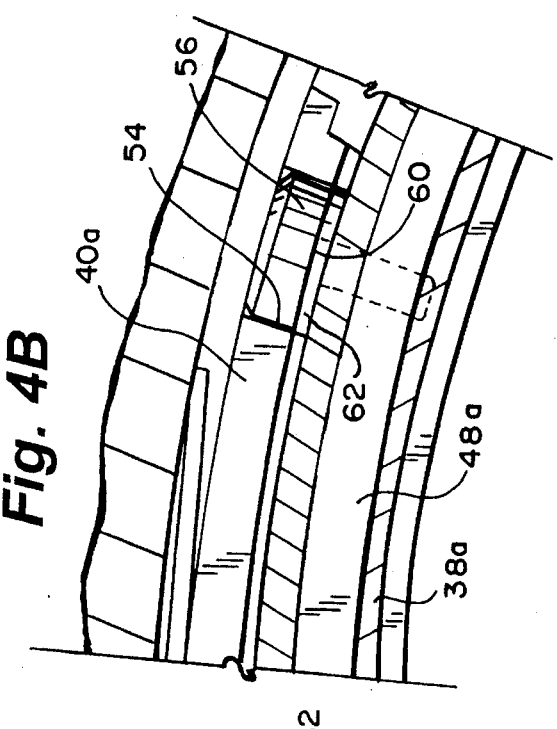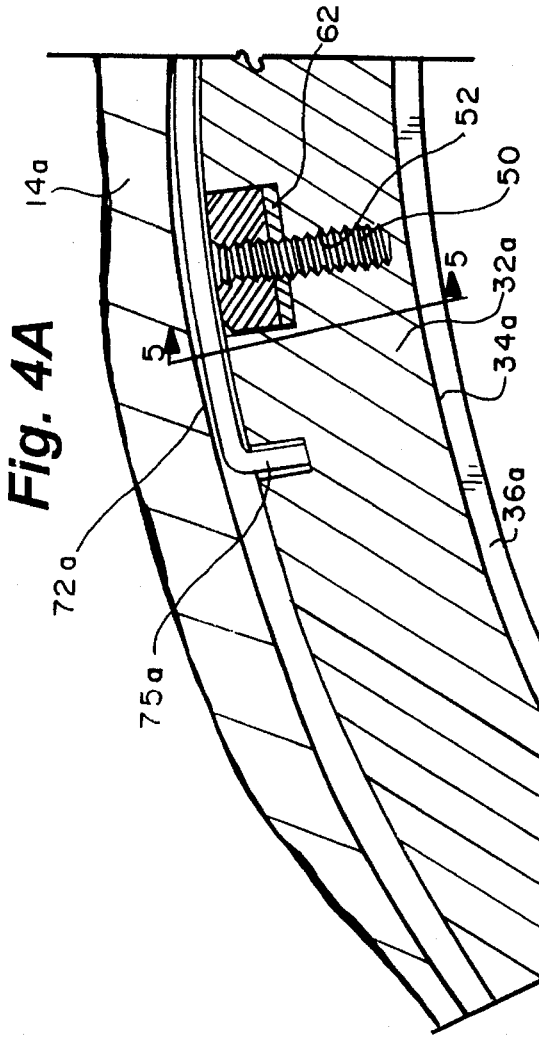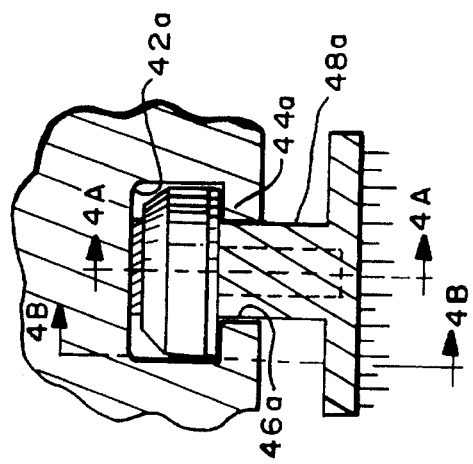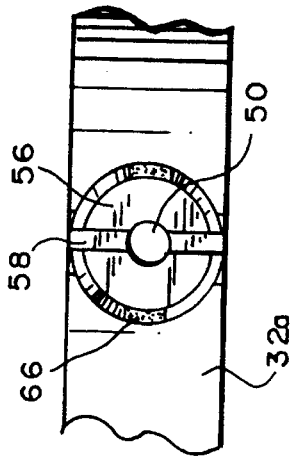

APPARATUS AND METHOD FOR PROVIDING UNIFORM RADIAL CLEARANCE OF SEALS BETWEEN ROTATING AND STATIONARY COMPONENTS

TECHNICAL FIELD

The present invention relates to seals between rotating and stationary components of a machine, for example, a steam turbine, and particularly relates to apparatus and a method for ensuring concentricity of a stationary seal face about the sealing surface of a rotating component, i.e., ensuring a substantially uniform radial clearance about and between the stationary seal face and the rotary component, in the event the stationary seal support structure is distorted or out-of-round, eccentric or non-standard in size. The present invention therefore attains a uniform seal to rotor radial clearance in the presence of a locating fit for the stationary seal face which is out-of-round, eccentric to the axis of rotation, or a custom or off-standard size. The present invention compensates for these factors in the stationary support structure without compromising the geometrical concentricity of the stationary seal face about the rotating sealing surface.

BACKGROUND

In many machines, seals are provided between rotating and stationary components. For example, in steam turbines, it is customary to employ a plurality of arcuate seal ring segments to form a labyrinth seal about and between the stationary and rotating components. Typically, the arcuate seal ring segments are disposed in an annular groove in the stationary component designed to be concentric about the axis of rotation of the machine and hence concentric to the sealing surface of the rotating component. Each arcuate seal segment carries an arcuate seal face in opposition to the sealing surface of the rotating component. In labyrinth-type seals, the seal faces carry a radially-directed array of axially spaced teeth, and which teeth are radially spaced from an array of axially spaced annular grooves forming the sealing surface of the rotating component. Alternatively, the rotating component may have a smooth surface in radial opposition to the array of teeth on the seal faces. In any event, the sealing function is achieved by creating turbulent flow of a working media, for example, steam, as it passes through the relatively tight clearances within the labyrinth defined by the seal face teeth and the opposing surface of the rotating component.

In a typical installation, the annular groove is dovetail-shaped, having locating flanges directed axially toward one another and defining a slot therebetween. The stationary component is split lengthwise such that the semi-annular dovetail grooves may receive correspondingly-shaped arcuate seal ring segments. More particularly, the arcuate segments are similarly dovetail-shaped, having a pair of flanges directed axially away from one another for disposition within the dovetail groove and a neck joining the seal face and the flanges of the segment and passing through the slot defined by the locating flanges of the grooves. The neck carries the arcuate seal face radially inwardly of the groove when installed.

In this type of seal, the ability to maintain a tight uniform clearance without physical contact between the rotating and stationary components is critical to the formation of an effective seal. If this radial clearance between the seal faces of the segments and the opposing seal surfaces of the rotating component becomes too large, less turbulence is produced and the sealing action is compromised. Conversely, if the clearance is too tight, the sealing teeth may contact the rotating element, with the result that the teeth lose their sharp profile and tight clearance and thereafter create less turbulence, likewise compromising the sealing action.

Seals of this type often do not obtain the designed uniform radial clearance about and between the stationary and rotating components for a number of reasons. For example, the locating fits, i.e., the locating flanges of the stationary component, may be distorted or out-of-round, relative to the sealing surface of the rotor. Conversely, the locating fits may be perfectly round but lie eccentric to the sealing surface and axis of the rotary component. The radial clearance between the stationary seal faces and the sealing surface of the rotating component, in either case, will not therefore be uniform about the rotor axis. Thirdly, the locating fit may be a custom size or non-standard in size. Even though round, it may not provide the designed radial clearance between the stationary and rotating components when the seal ring segments are replaced. Of course, various combinations of out-of-roundness, eccentricity and non-standard sizes may occur.

Turning first to the locating fits which have become distorted or out-of-round, e.g., as a result of high pressure and temperature applications, such distortion directly affects the dimensional consistency of the labyrinth seal's internal clearance and thus the seal's effectiveness. In most instances, the locating flanges will distort, with an opening effect on one axis which will result in a closing effect on a perpendicular axis. For example, the locating flanges on the stationary component tend to be deformed into an elliptical configuration which prevents the formation of a uniform seal clearance about the rotating component. The magnitude of the ellipticity present translates directly into excessive clearance of the seal faces of the segments relative to the sealing surface of the rotor across the major diameter of the elliptical bore and minimum clearance across the minor diameter of the elliptical bore. The seal clearances thus vary from a condition of interference on one axis and excessive clearance on the other, resulting in loss of the effectiveness of the seal.

As noted previously, the locating fits may themselves be round, but, due to variations of alignment, they may not lie concentric to the sealing surface of the rotating component. As a consequence, the seal faces of the segments may lie eccentric to the locating fit, i.e., the locating flanges, but do not afford a uniform radial clearance between the stationary seal faces and the sealing surface of the rotating component about the full circumference of those components. Also, where the locating flanges are non-standard or of unknown dimension due to prior field machining, standard seal segments may not provide the designed uniform radial clearance even if the locating flanges are perfectly round. The seal clearances must be maintained substantially uniform and at the designed clearance.

When renewing labyrinth seals of this type after use, the design of the locating flanges of the groove into which the arcuate segments fit prevent their ready adjustment in radial location. Restoration of the locating flanges of the groove is too costly. Typically, when new arcuate seal segments were installed into a groove where the locating flanges are distorted or out-of-round, or eccentric, the installer carefully identified the locations where the seal clearance was too tight. Once identified, the installer would hand-scrape or grind the edges of the seal teeth to produce the necessary clearance. No remedial action was typically taken where the seal tooth-to-rotor clearance was excessive. This excessive clearance was conventionally left in an as-is condition. Because of the time and expense involved in the restoration of the locating flanges of the groove to true concentricity about the rotor surface, excessive seal clearances were conventionally accepted as a parasitic loss associated with age and distortion, and not repaired.

In U.S. patent application Ser. No. 07/981,520, filed Nov. 25, 1992, of common assignee herewith, there is illustrated apparatus and methods for establishing a substantially uniform radial clearance about and between the rotating component and the segment seals. This is accomplished by providing locating elements along the locating flanges of the arcuate segments which could be adjusted or ground to an appropriate depth to adjust the clearance between the locating flanges of the segment and the groove, thereby to maintain concentricity of the stationary and rotating seal faces, while simultaneously mounting the arcuate segments directly on the distorted, eccentric or non-standard size locating flanges of the groove. In practice, axially extending dowels have been employed along the underside of the locating flanges of the arcuate segments and which dowels are typically ground in the field when the segments are to be replaced to assure this concentricity. Use of these round dowels in the field during installation of the arcuate segments requires substantial installation time and expense because of the required machining and replacement of the existing dowels. Machining dowels in place to adjust the clearances is very difficult and remaking new dowels when shy of stock material is extremely time-consuming.

DISCLOSURE OF THE INVENTION

According to the present invention, there are provided apparatus and method for establishing substantially uniform radial clearance about and between the seal surfaces of stationary and rotating components when installing arcuate packing ring segments in rotary machines employing labyrinth seals without compromising the integrity or efficiency of the seal. To accomplish this, and without grinding or regrinding as previously necessary in the field, particularly where dowels were used to establish the clearance, the present s invention, in part, provides threaded pins at circumferentially spaced locations along the arcuate segments and which pins are preferably fixed to the arcuate segments and extend in a radial direction. A set of shims is provided having various predetermined thicknesses, i.e., radial thicknesses. A member in the form of a threaded nut is threadedly received on the threaded pins. Once the appropriate clearance between the locating flange of the arcuate segment and the locating flange of the diaphragm at the appropriate circumferential location is determined, a shim is selected from the set of shims having the appropriate thickness to accommodate the out-of-roundness or eccentricity of the diaphragm-locating flanges. The shims are each in the form of a washer receivable over the pins. Thus, by applying a selected shim of appropriate thickness on the pin and securing the shim between the nut and the neck of the arcuate segment, the desired projection radially inwardly below the locating flanges of the arcuate seal segment is afforded. Thus, the shim rests on the locating flanges or hooks of the diaphragm and the eccentricity or out-of-roundness of the diaphragm is accommodated. Note that the foregoing does not require any grinding and this is particularly important for field installation of renewed arcuate seal segments.

In a preferred embodiment according to the present invention, there is provided in a machine having rotating and stationary components formed about an axis, a seal comprising an annular groove formed in the stationary component including at least one axially directed locating flange about the axis and in part defining a slot opening into the groove, the seal further including about the machine axis a plurality of arcuate segments each having an arcuate seal face, a neck portion received in the slot and at least one axially directed flange disposed within the groove and spaced radially from the locating flange, locating elements including a pair of pins secured to each arcuate segment at circumferentially spaced positions thereabout and projecting generally in a radial direction, the pins having threads, shims about the pins and having a predetermined radial extent, and members having threads complementary to the threads on the pins and being threaded relative to the pins to engage the shims and project the shims radially inwardly of one flange of the segments a predetermined distance to adjust the radial spacing between the locating flange and the one flange of the segments thereby establishing a substantially uniform radial clearance about and between the rotating component and the segment seal faces.

In a further preferred embodiment according to the present invention, there is provided in a machine having rotating and stationary components formed about an axis, a seal comprising an annular groove formed in the stationary component and including a pair of locating flanges about the axis and directed axially toward one another defining a slot therebetween, the seal further including about the machine axis a plurality of arcuate segments each having an arcuate seal face, a neck portion received in the slot and a pair of flanges directed axially away from one another and disposed within the groove, the flanges of the segments and the locating flanges of the grooves being radially spaced from one another, locating elements including a pair of pins secured to each arcuate segment at circumferentially spaced positions thereabout and projecting generally in a radial direction, the pins having threads, shims about the pins and having a predetermined radial extent, and members having threads complementary to the threads on the pins and being threaded relative to the pins to engage the shims and project the shims radially inwardly of the segment flanges a predetermined distance to adjust the radial spacing between the locating flanges and the flanges of the segments, thereby establishing a substantially uniform radial clearance about and between the rotating component in the segment seal faces.

In a still further preferred embodiment according to the present invention, there is provided in a machine having a component rotatable about an axis and a stationary component including an annular groove about the axis, the stationary component having at least one axially directed locating flange about the axis and in part defining a slot opening into the groove and a plurality of annular segments about the axis, each segment having an arcuate seal face, at least one axially directed flange for disposition in the groove, and a neck portion receivable in the slot and interconnecting the seal face and the flange of the segment, a method of compensating for deviation in radial clearance between the seal faces and the rotatable component from a predetermined, substantially uniform radial clearance therebetween, comprising the steps of identifying the extent of the deviation of the locating flange of the groove from a predetermined radial location thereof about the axis, locating a pair of pins in each arcuate segment at circumferentially spaced positions thereabout projecting generally in a radial direction, disposing at least one shim about each pin, each shim having a predetermined radial extent, and disposing members on the pins to engage the shims and project the shims radially inwardly of one flange of the segments a predetermined distance to adjust the radial spacing between the locating flange and the flanges of the segments, thereby establishing a substantial uniform clearance about and between the seal of the segments and the rotating component.

Accordingly, it is a primary object of the present invention to provide novel and improved apparatus and methods for maintaining a uniform radial clearance between the seal faces of a stationary component relative to the sealing surface of a rotating component in a manner which compensates for any distortion or out-of-roundness, eccentricity or non-standard size of the locating fit on the stationary support mounting the seal faces and which is particularly useful for field installations.

BRIEF DESCRIPTION OF THE DRAWINGS

FIGS. 4A and 4B are fragmentary enlarged cross-sectional views taken generally about on lines 4A—4A and 4B—4B in FIG. 5, illustrating a seal segment and its locating fit;

FIG. 5 is a cross-sectional view of a locating element taken generally about on line 5—5 in FIG. 4A;

FIG. 6 is a plan view of a locating element in a seal segment;

BEST MODE FOR CARRYING OUT THE INVENTION

Reference will now be made in detail to a present preferred embodiment of the invention, an example of which is illustrated in the accompanying drawings.

Figure 1:
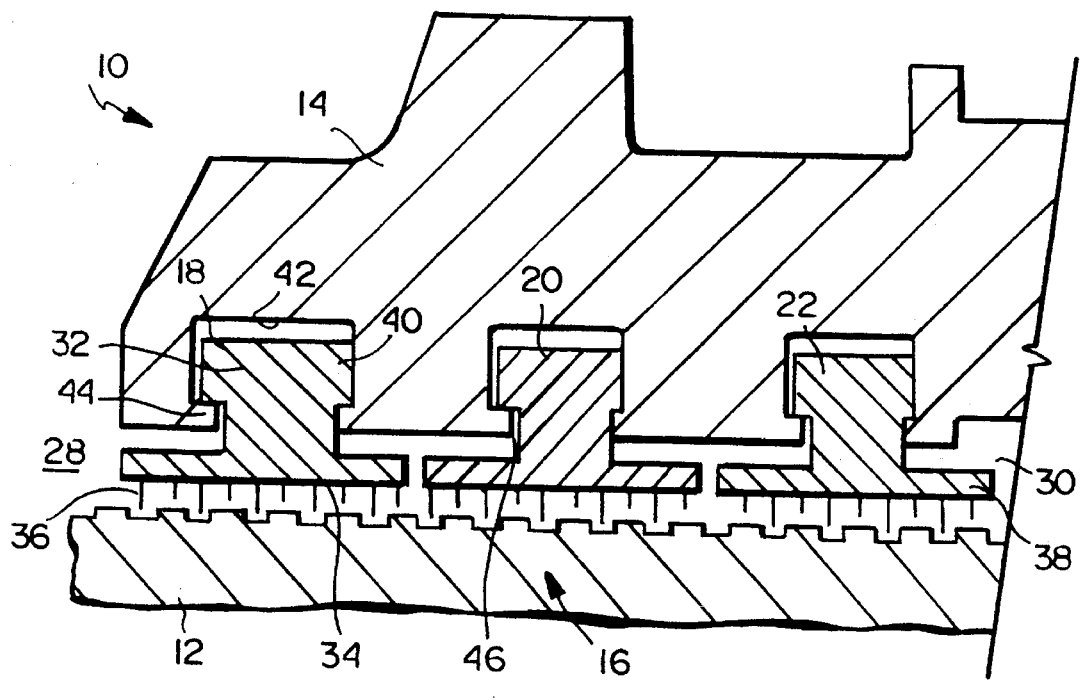
FIG. 1 is a fragmentary cross-sectional view of a portion of a steam turbine looking transversely of the axis thereof and illustrating a prior art labyrinth seal.

Referring now to FIG. 1, there is illustrated a portion of a steam turbine, generally designated 10, having a turbine shaft 12, disposed in a turbine housing 14, and which shaft is supported for rotation by conventional means, not shown, within turbine housing 14. A multiple-stage labyrinth seal 16 includes a plurality of seal rings 18, 20 and 22 disposed about turbine shaft 12 separating high and low pressure regions 28 and 30, respectively. Each seal ring is formed of an annular array of a plurality of arcuate seal segments 32. In general, labyrinth seal 16 functions by placing a relatively large number of partial barriers to the flow of steam from the high pressure region 28 to the low pressure region 30. Each barrier forces steam, attempting to flow parallel to the axis of turbine shaft 12, to follow a tortuous path whereby a pressure drop is created. The sum of all the pressure drops in the labyrinth seal 16 is, by definition, the pressure difference between the high and low pressure regions 28 and 30.

As explained previously, one of the major problems associated with the initial placement of the annular sealing rings and their maintenance, including refurbishing and replacement, is the necessity to maintain the seal ring segments 32 concentric about and with seal faces at a uniform radial clearance with the sealing surface of the rotor, notwithstanding any distortion, eccentricity or non-standard size of the locating flanges or hooks (locating fit) of the groove which form part of the housing for the seal rings. That is, the locating flanges of the seal ring support structure, oftentimes with use and wear, obtain an ellipticity or an eccentricity with respect to the rotor axis or lie at different radii from the axis forming an eccentricity in the axial direction whereby fitting the seal ring segments to the locating flanges results in a lack of concentricity of, and non-uniform radial clearance between, the seal faces and the sealing surface of the rotor. Also, even if the locating flanges are round and coaxial with the rotor shaft, the desired uniform radial clearance, for example, during replacement of the segments, may not be obtained due to the non-standard size of the locating fit. The present invention therefore affords and maintains a uniform radial clearance between the seal faces of the segments and the sealing face of the rotor, notwithstanding any out-of-roundness or eccentricity of the locating flanges of the turbine housing due to use and wear or a non-standard size of the locating flanges and affords such uniform radial clearance and concentricity in both conventional and positive pressure variable clearance type labyrinth seal rings.

Figure 2A:
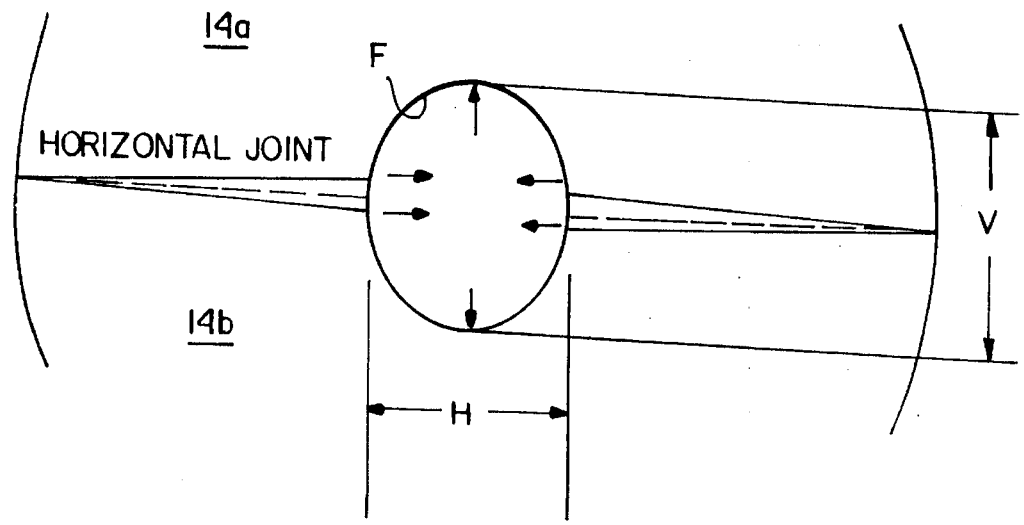
FIGS. 2A and 2B are schematic representations of upper and lower portions of a turbine casing having out-of-round or elliptical fits for the turbine seal.
Figure 2B:
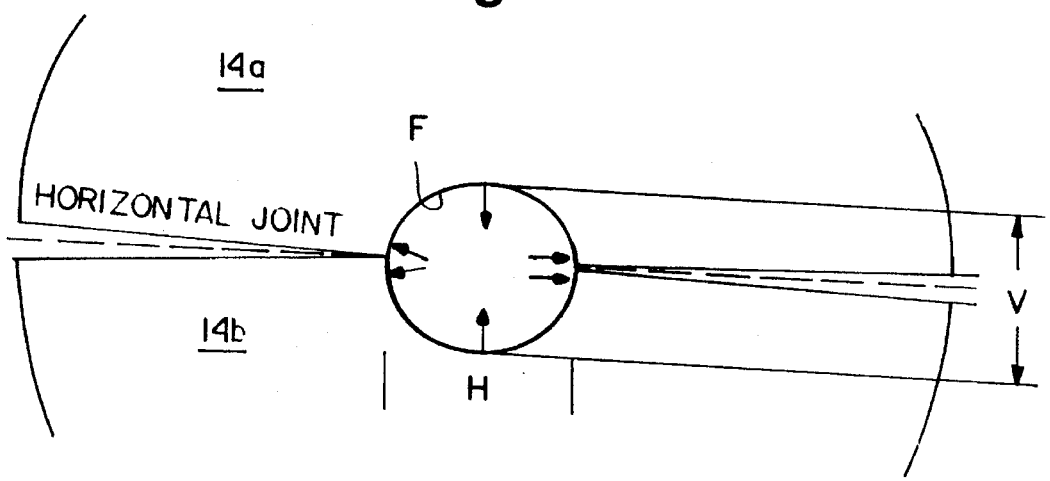
Figure 3:
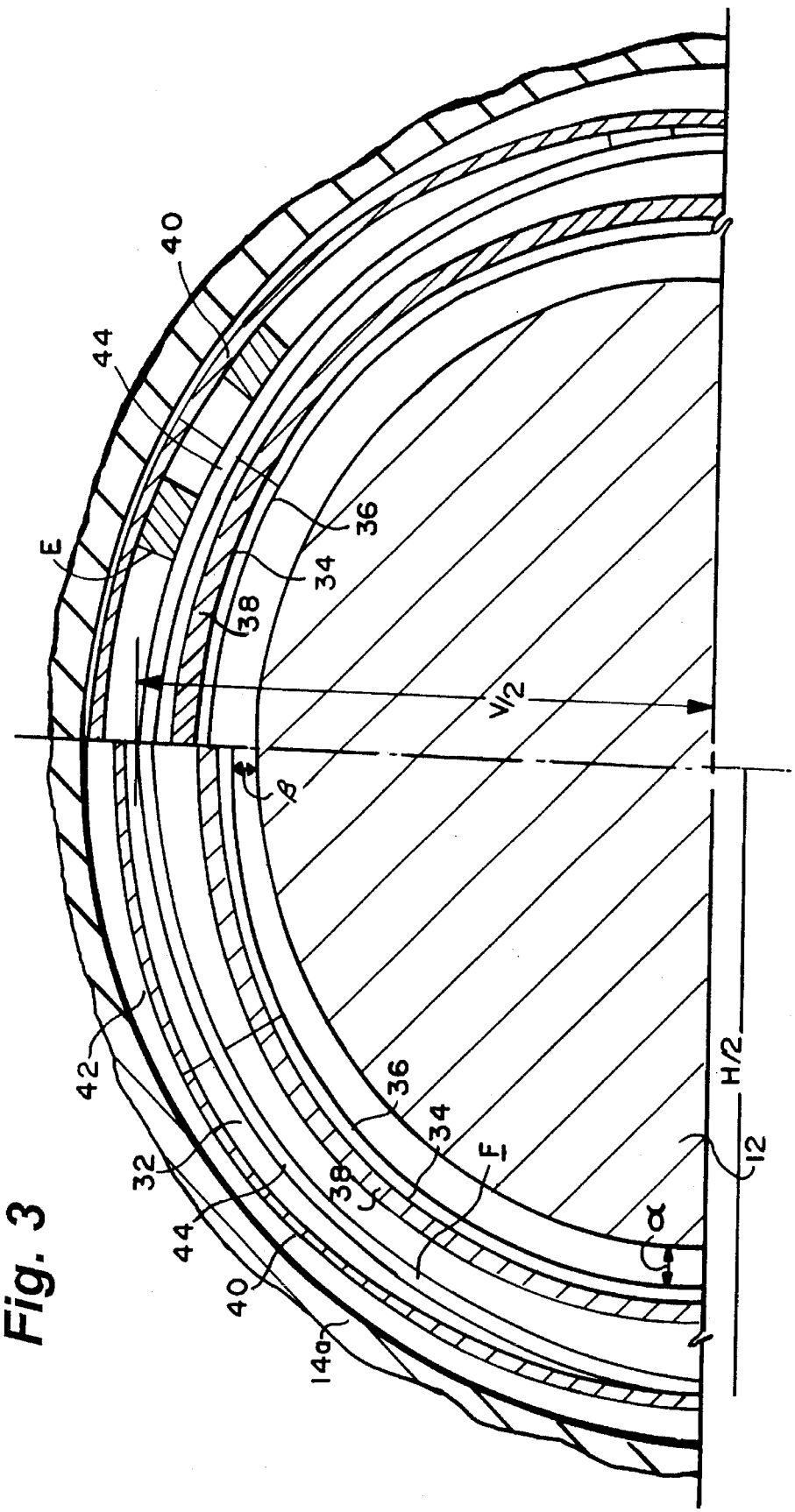
FIG. 3 is a split cross-sectional view of portions of a fit for the seal of a rotor with the left quadrant illustrating an aspect of the problem solved by the present invention and the right quadrant illustrating a solution to that problem according to the present invention.

To illustrate the problem solved by the present invention, and specifically with respect to an out-of-roundness condition in the stationary support structure, reference is made to FIGS. 2A and 2B and to the left side of FIG. 3. In FIG. 2A, there is schematically illustrated upper and lower portions 14a and 14b, respectively, of a turbine housing. The locating fit for the arcuate ring segments is illustrated at F and, of course, the rotor shaft lies within fit F. Over time, e.g., with variations in temperature and pressure and other factors, the rotating fit F may come out-of-round and typically obtains an elliptical configuration, for example, the configuration of FIG. 2A with major and minor axes V and H, respectively, where V is greater than H. As illustrated in FIG. 2A, this sometimes occurs along the horizontal joint between turbine housing portions 14a and 14b with the joint tending to open along the radial interior of the casing 14 forming the elliptical fit F. In FIG. 2B, the distortion of the locating fit F is similarly elliptical but with the major axis H lying horizontal, H being greater than the minor axis V. In this situation, the horizontal joint opens radially outwardly of the casing 14. In either case, the fit F for receiving the arcuate seal ring segments 32 is distorted and out-of-round. Of course, variations in the fit F may occur which are of different configurations than elliptical and these likewise are accommodated by the present invention.

The elliptical configuration of the upper quadrant illustrated in FIG. 2B is illustrated in more detail in FIG. 3. It will be appreciated that the FIG. 3 illustration is exaggerated and certain elements are out of proportion relative to other elements to illustrate the nature of the problem and its solution according to the present invention.

With respect to FIGS. 1 and 3, the arcuate seal ring segments 32 have sealing faces 34 and radial projecting teeth 36, each sealing face 34 being formed by a pair of flanges 38 extending axially away from one another. The outer portions of the seal ring segments 32 include locating flanges or hooks 40 which similarly extend from segment 32 in axially opposite directions away from one another. As illustrated in FIG. 1, the turbine housing 14A has a generally dovetail-shaped annular groove 42 defined along its radially innermost portions by a pair of locating flanges 44 which extend axially toward one another defining a slot 46 therebetween.

Referring now to the left side of FIG. 3, it will be seen that, with the ellipticity illustrated in FIG. 2B, the locating flange 44 of the fit F is distorted, i.e., out-of-round. That is, the distance V/2 in the vertical direction from the rotor axis to flange 44 is less than the distance H/2 in the horizontal direction from the axis of rotor 12 to flange 44. With segments 32 lying along arcs of circles, it will be seen that the locating fits of segment flanges 40 and groove flanges 44 do not match and that, as a consequence, seal faces 34 have different radial clearances $\alpha$ and $\beta$ at different circumferential locations with respect to the sealing face of rotor 12. Seal faces 34 do not therefore have uniform radial clearances with respect to the shaft.

To provide a uniform radial clearance between the seal faces of the segments and the sealing surface of shaft 12 in accordance with the present invention, reference is made to the right-hand side of FIG. 3. In this illustration, locating flange 44 of the groove fit F has the same ellipticity as illustrated in FIG. 2B and is the mirror image of the left side of FIG. 3. However, means are provided in accordance with the present invention for enabling adjustment of the radial spacing between the locating flange 44 and the locating flange 40 of the segments 32 to establish a substantially uniform radial clearance about and between the rotating component 12 and the segmented seal faces 34 notwithstanding distortion, eccentricity or non-standard size of locating flanges 44. Generally, the adjusting means includes locating elements E which can be adjusted in radial extent for accommodating the variable radial distances between the segment flanges and the locating flanges resulting from the eccentricities or out-of-roundness. Preferably, the locating elements E are carried by segments 32 at circumferentially spaced positions therealong, there being at least two elements per segment. The variable radial extent of the locating elements enables the locating flanges of the segment and the locating flanges of the groove to be variably spaced from one another about the circumference to compensate for any distortion, eccentricity, or non-standard size of the locating flanges thereby to provide a uniform radial clearance between the segment seal faces 34 and the sealing face of the rotor 12.

Referring now to FIG. 4A and 4B, there is illustrated a labyrinth seal of the same general configuration illustrated in FIG. 1 and incorporating the adjusting feature of the present invention. The seal includes a plurality of arcuate packing ring segments 32a arrayed about the machine axis, there being typically six segments. As previously described, each segment comprises an arcuate sealing face 34a having a plurality of axially spaced teeth 36a extending radially inwardly therefrom, sealing face 34a being formed by the inner circumferentially extending surface of seal ring segment 32a defined by the pair of axially projecting flanges 38a. A pair of locating flanges or hooks 40a (FIG. 4B) are provided along outermost portions of seal ring segments 32a and similarly extend from segments 32a in axially opposite directions away from one another. Turbine housing 14a has a generally dovetail-shaped annular groove 42a defined along its radially innermost portions by a pair of flanges 44a (FIG. 5) which extend axially toward one another defining a slot 46a therebetween. Seal ring segment 32a also includes a neck 48a which interconnects seal face 34a including flanges 38a with the radially outermost flange 40a and, when segment 32a is installed in the groove 42a, the neck 48a extends in slot 46a between flanges 44a. Segment 32a also includes a leaf spring 72a having a radially inwardly turned end 75a engaging in a slot along the outer surface of segment 32a. When the segment is installed, the spring engages the roof of the groove 42a and biases the segment for radial inward movement. The shaft 12, not shown in these drawing figures, lies in radial opposition to the sealing ring faces 34a of segments 32a and has a plurality of grooves which are axially spaced one from the other and extend circumferentially about the shaft. The grooves along the shaft cooperate with teeth 36a to form a turbulent flow path for the steam.

With reference to FIG. 4B, 5 and 6, and in accordance with the present invention, there is provided for each segment as illustrated one or more locating elements E for locating the flanges 40a of the sealing segment 32a relative to the locating flanges 44a of the fit. In a preferred form, the locating element E includes a pin 50, preferably screwthreaded in a complementary threaded bore 52 in the neck 48a of the seal segment. The pin 50 projects into an axially extending opening 54 formed between interrupted radially outermost flanges 40a of the seal segment. Pin 50 is preferably permanently fixed to the seal segment and need not be threaded its entire length but may be threaded only for the portion of the pin projecting into the bore 52.

Disposed within opening 54 is a member in the form of, for example, an annular nut 56 having a central opening, preferably internally threaded, for cooperation with the external threads on pin 50 whereby the nut 56 can be screwed on pin 50 in opening 54. The outer face of the nut 56 may have a groove 58 forming a slot for receiving a tool, for example, a screwdriver.

Figure 8:
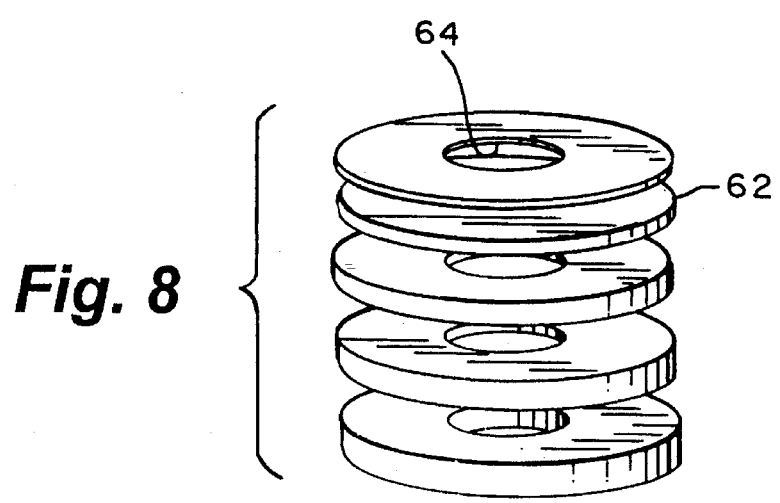
FIG. 8 is a perspective view of a set of shims for use in the present invention.

Between the radially innermost surface 60 of nut 56 and the radially outer surface of the locating flanges 44a of the fit, one or more shims 62 are provided. The shims, as illustrated in FIG. 8, essentially comprise washers provided in a set of shims having various predetermined thicknesses. The shims 62 have central openings 64 for reception about the pin 50. By locating one or more shims of selected thicknesses in relation to a reference location on the sealing segment, e.g., the underside of locating flanges 40a, gaps between the locating flanges 44a and the flanges 40a of the seal segments of various sizes can be accommodated in order to ensure concentricity of the seal faces of the seal segments about the sealing surfaces of the rotor.

Consequently, in contrast to the prior practice of employing dowels between these locating flanges ground to provide the various radial distances between the flanges, the present invention entirely eliminates the need for grinding dowels or forming new dowels where there is insufficient surplusage of material or any material to span the gap between the locating flanges of the seal segment and the fit. Thus, by selecting one or more of the shims of various thicknesses to accommodate that gap, the shim or shims may be disposed about the pin 50 and the nut 56 screwthreaded down onto the shims. To secure the nut in place, weld material may be provided between the nut and the surfaces of the seal segment forming the opening 54 for receiving the nut as illustrated at 66 in FIG. 6.

Figure 7:
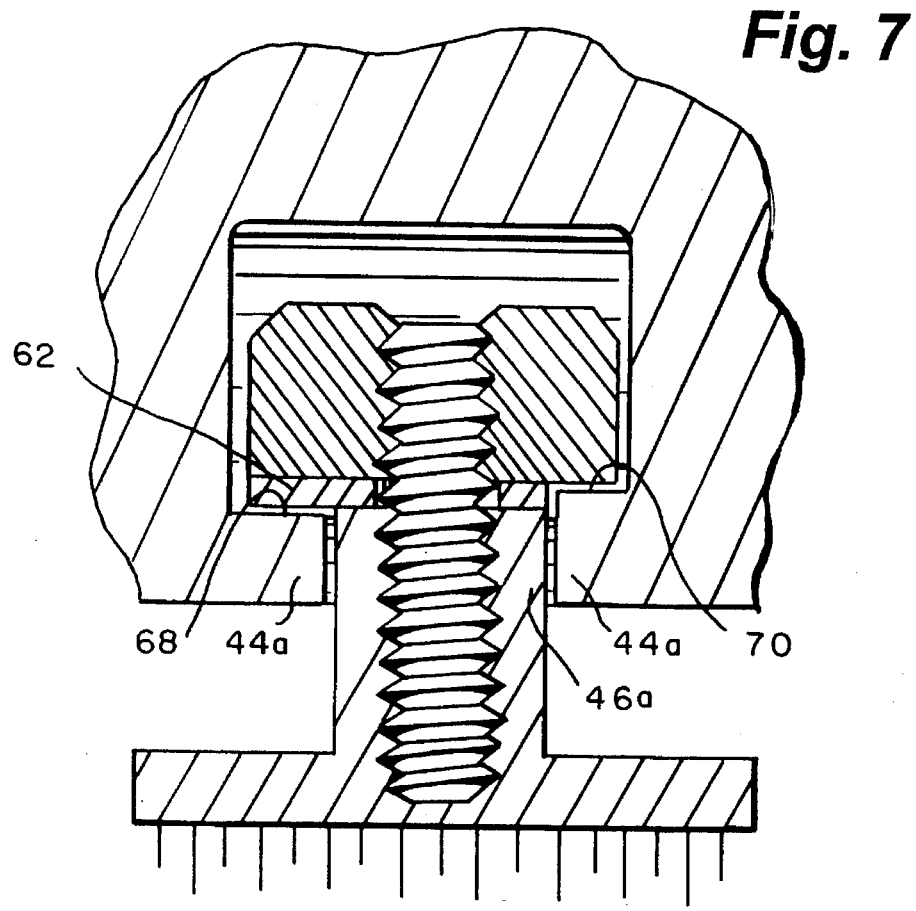
FIG. 7 is an enlarged fragmentary cross-sectional view illustrating the seal segment hereof with locating element disposed for correcting axial misalignment.

Referring now to FIG. 7, the fit, e.g., the locating flanges 44a on opposite sides of the opening 46a, may be misaligned relative to one another in an axial direction. That is, the locating surfaces of the flanges 44a may lie at different radial locations. The present invention may accommodate such axial misalignment. As greatly exaggerated and illustrated in FIG. 7, the left-hand or admission side locating flange 44a has a locating surface 68 radially inwardly of the locating surface 70 of the right-hand locating flange 44a. To accommodate this misalignment, a shim or shims may be selected for adjusting the gap on the left or admission side between the locating flanges 40a of the seal segment and the locating flange 44a of the fit as previously described. The portion of the shim or shims normally projecting from the seal segment on the opposite side thereof is removed as illustrated. It will be appreciated that shims of different sizes can be used in combination in this embodiment with one shim extending between the locating flanges on the admission and exit sides of the sealing segment and another shim being sheared or cut to lie only along one side or the other as necessary for accommodating the axial misalignment.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims.

What is claimed is:

1. In a machine having rotating and stationary components formed about an axis, a seal comprising:

an annular groove formed in the stationary component including at least one axially directed locating flange about said axis and in part defining a slot opening into said groove, said seal further including about the machine axis a plurality of one-piece arcuate segments each having an arcuate seal face, a neck portion received in said slot and at least one axially directed flange disposed within said groove and spaced radially from said locating flange;

locating elements including a pair of pins secured to each said arcuate segment at circumferentially spaced positions thereabout and projecting generally in a radial direction, said pins having threads, shims about said pins and having a predetermined radial extent, and members having threads complementary to the threads on said pins and being threaded relative to said pins to engage said shims and project said shims radially inwardly of said one flange of said segments a predetermined distance to engage said locating flange and adjust the radial spacing between said locating flange and the one flange of said segments thereby establishing a substantially uniform radial clearance about and between the rotating component and the segment seal faces.

2. A seal according to claim 1 wherein said locating flange is out-of-round about the machine axis and, without correction, prevents said seal faces of said segments from maintaining concentricity of said seal faces about the rotating component, the radial extent of said shims being in accordance with the extent to which the locating flange is out-of-round about the axis at corresponding circumferential positions to provide said correction to maintain substantial concentricity of said seal faces relative to the rotating component.

3. A seal according to claim 1 wherein each said segment has a pair of slots extending therethrough in an axial direction, said members and said shims being received in said slots.

4. A seal according to claim 1 including a set of shims having different thicknesses relative to one another, said locating element at each circumferential position about the segments having at least one shim selected from said set of shims.

5. In a machine having rotating and stationary components formed about an axis, a seal comprising:

an annular groove formed in said stationary component and including a pair of locating flanges about said axis and directed axially toward one another defining a slot therebetween, said seal further including about the machine axis a plurality of one-piece arcuate segments each having an arcuate seal face, a neck portion received in said slot and a pair of flanges directed axially away from one another and disposed within said groove, said flanges of said segments and said locating flanges of said grooves being radially spaced from one another;

locating elements including a pair of pins secured to at least one of said arcuate segments at circumferentially spaced positions and projecting generally in a radial direction, said pins having threads, at least one shim about each said pin and having a predetermined radial extent, and members having threads complementary to the threads on said pins and being threaded relative to said pins to engage said shims and project said shims radially inwardly of said segment flanges a predetermined distance to engage said locating flanges and adjust the radial spacing between said locating flanges and the flanges of said segment, thereby establishing a predetermined radial clearance about and between the rotating component and the segment seal face.

6. A seal according to claim 5 wherein said locating flanges are out-of-round about the machine axis and, without correction, prevent said seal faces of said segments from maintaining concentricity of said seal faces about the rotating component, the radial extent of said shims being in accordance with the extent to which the locating flanges are out-of-round about the axis at corresponding circumferential positions to provide said correction to maintain substantial concentricity of said seal faces relative to the rotating component.

7. A seal according to claim 5 wherein each said pin is externally threaded and each said member is internally threaded.

8. A seal according to claim 5 wherein each of said shims has an opening to enable each said shim to be received about its respective said pin.

9. In a machine having a component rotatable about an axis and a stationary component including an annular groove about said axis, said stationary component having at least one axially directed locating flange about said axis and in part defining a slot opening into said groove and a plurality of one-piece annular segments about said axis, each segment having an arcuate seal face, at least one axially directed flange for disposition in said groove, and a neck portion receivable in said slot and interconnecting said seal face and the flange of said segment, a method of compensating for deviation in radial clearance between said seal faces and the rotatable component from a predetermined, substantially uniform radial clearance therebetween, comprising the steps of:

identifying the extent of the deviation of the locating flange of the groove from a predetermined radial location thereof about the axis;

locating a pair of pins in each arcuate segment at circumferentially spaced positions thereabout projecting generally in a radial direction;

disposing at least one shim about each said pin, each said shim having a predetermined radial extent; and disposing members on said pins to engage said shims and project said shims radially inwardly of said one flange of said segments a predetermined distance into engagement with said one locating flange to adjust the radial spacing between the one locating flange and the flanges of the segments, thereby establishing a substantial uniform clearance about and between the seal of the segments and the rotating component.

10. A method according to claim 9 including providing a set of shims having different radial thicknesses relative to one another, selecting one shim from said set of shims and disposing said selected one shim at a selected circumferential position about a segment, the thickness of said selected one shim of said set of shims corresponding to the deviation in radial clearance between the seal faces and the rotatable component from the predetermined, substantially uniform radial clearance therebetween.

* * * * *